United States Patent Office 3,409,631
Patented Nov. 5, 1968

3,409,631
PROCESS FOR THE PREPARATION OF ISO-CYANATES CONTAINING THIOETHER GROUPS
Hans Holtschmidt, Leverkusen, and Helmut Freytag, Cologne-Stammheim, Germany, assignors to Farbenfabriken Bayer Aktiengesellschaft, Leverkusen, Germany, a corporation of Germany
No Drawing. Filed Feb. 17, 1965, Ser. No. 433,490
Claims priority, application Germany, Feb. 19, 1964,
F 42,052
12 Claims. (Cl. 260—306)

ABSTRACT OF THE DISCLOSURE

Sulfenyl halide isocyanates, their preparation from organic isocyanates containing a disulfide group and their use for reactions with unsaturated organic compounds to prepare isocyanates containing thioether groups.

---

This invention relates to isocyanates, particularly to sulfur-containing isocyanates and more particularly to isocyanates containing a thioether group and to a method for preparing the same.

Heretofore, isocyanates and processes for the preparation of isocyanates containing thioether groups were known in the literature (see Annalen der Chemie, vol. 562, page 75 (1949) and DBP 1 119 853). In these processes, the corresponding amino compounds were reacted with phosgene by the classical methods of isocyanate chemistry. However, for many reasons, it is desirable to introduce the NCO group into the molecule under very mild conditions. This applies particularly to compounds containing thioether groups, tertiary nitrogen atoms, ester groups of tertiary alcohols, and many other groups which undergo decomposition or undesirable side reactions in the presence of heat, phosgene, and/or hydrogen chloride gas.

Therefore, it is an object of this invention to provide a method for preparing sulfur-containing isocyanates. Another object of this invention is to prepare isocyanates containing a sulfenyl halide group. Still another object of this invention is to provide a method for preparing isocyanates containing a sulfenyl halide group. A further object of this invention is to provide a method for preparing isocyanates containing a thioether group. A still further object of this invention is to provide a method for preparing isocyanates containing a thioether group from sulfenyl halide isocyanates.

These and other objects which will become apparent from the following description are accomplished in accordance with the invention, generally speaking, by subjecting, in a first step, isocyanates containing a disulfide group in the molecule to halogenolysis to produce sulfenyl halide isocyanates and thereafter reacting, in a second step, the thus-obtained sulfenyl halide isocyanates with an unsaturated organic compound which is free of functional groups that react with the isocyanate groups at relatively cold temperatures. The isocyanates containing a sulfenyl halide group obtained by treating a disulfide-containing isocyanate in the first step of the above process may be represented by the following general formula:
X—S—R—NCO wherein R is a divalent organic radical having from 1 to 16 carbon atoms. Thus, R in the above formula may be substituted or unsubstituted and may be an alkylene radical, an arylene radical, an alkarylene radical, an aralkylene radical, and so forth. Aromatic radicals are preferred. X is a halogen radical having an atomic number between 17 and 35, inclusive. Other substituents which may be connected to the organic group R above are halogen groups, nitro groups, alkyl groups, cycloalkyl groups, alkoxy groups, aralkoxy groups, and cycloalkoxy groups. In addition to the above groups, sulfide radicals containing alkyl, aryl, or cycloalkyl groups may also be connected to R above.

It has now been found that isocyanates having thioether groups can be obtained in a smooth reaction without having to employ vigorous reaction conditions associated with the phosgenation of the corresponding amines by first forming sulfenyl halide isocyanates by halogenolysis of isocyanates having a disulfide group in the molecule and thereafter reacting the sulfenyl halide isocyanates with an unsaturated organic compound.

Isocyanates having a sulfenyl halide group have not hitherto been known. Surprisingly, the preparation of the sulfenyl halide isocyanates and their stability was completely unexpected as a matter of course. It was known that, for example, ketones, which in many cases behave like analogues of isocyanates (see Angewandte Chemie, vol. A 59, page 257 (1948), Annalen der Chemie, vol. 602, page 1 et seq. (1957)), react very easily with sulfenyl chlorides, as illustrated by the following equation:

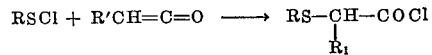

Furthermore, it was known that sulfenyl halides readily react with compounds which have a certain CH acidity (e.g., with phenols, phenol ethers, dimethylaniline, aromatic hydrocarbons), which results in the splitting off of HCl and the formation of thioethers (see Houben-Weyl, Methoden der organischen Chemie, vol. 9, page 277, and vol. 85, page 338 (1952)). Since NCO groups on the aryl nucleus also act as positive substituents to activate the hydrogen atoms on the nucleus, it was to be expected that condensation would also take place between the SCl group and the activated aryl nucleus and that, consequently, the aryl isocyanates which contain sulfenyl halide groups would at least be very unstable. Contrary to all expectations, these side reactions were not observed, or at least not to any significant extent. Instead, by the action of halogenating agents on isocyanates which contain a disulfide group in the molecule, the corresponding sulfenyl halide isocyanates are obtained in excellent yields.

In the preparation of sulfenyl halide isocyanates, the isocyanate containing a disulfide group in the molecule is contacted with halogen-containing compound at a temperature preferably below 70° C. in the absence of moisture. Some of the disulfide isocyanates that can be used for halogenolysis are known in the literature, and in that regard see "Annalen der Chemie," vol. 562, page 75 (1949), and others are obtainable by the classical methods of isocyanate chemistry. The following are representative compounds of the type of disulfide isocyanates which may be used:

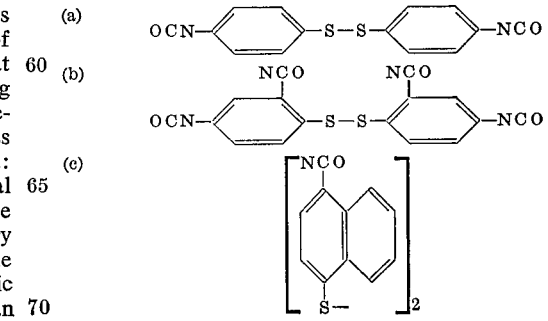

(d) 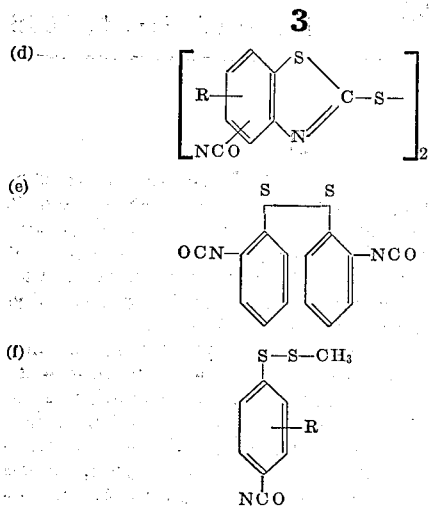

(e)

(f) 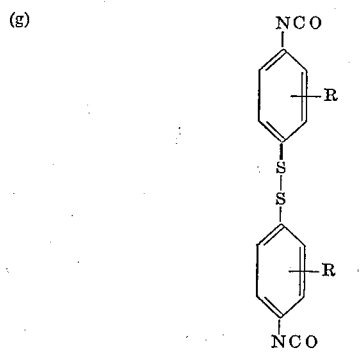

where R is hydrogen, halogen, nitro, or an alkyl group having from 1 to 8 carbon atoms, a cycloalkyl group having from 7 to 12 carbon atoms, or —OR' or —SR', and where R'=an alkyl group having from 1 to 8 carbon atoms, an aryl group, or a cycloalkyl group having from 7 to 12 carbon atoms.

(g)

where R is hydrogen, halogen, nitro, or an alkyl group having from 1 to 8 carbon atoms, a cycloalkyl group having from 7 to 12 carbon atoms, or —OR', or —SR'. where R' is defined above.

(h)     OCN(CH$_2$)$_2$—S—S—(CH$_2$)$_2$—NCO (i)     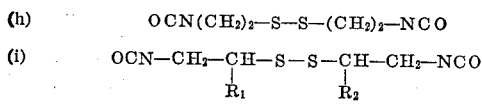

where $R_1$ and $R_2$ may be the same or different and represent an aryl group or an alkyl group having 1 to 8 carbon atoms.

It is also possible for the process of this invention to use reaction products of mono or polyhydric alcohols with an excess of isocyanates. In other words, compounds which contain a urethane group that is, a bivalent

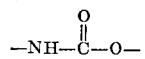

radical, in the molecule, that is, as an integral part of the radical chain, in addition to an NCO group. Such compounds may be illustrated by the following formula:

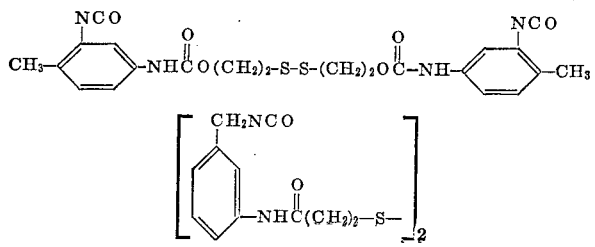

In the case of the above formula, surprisingly it was found that the urethane group was not attacked by the halogenating agent.

Also, sulfides which contain the NCO group in a masked form from which it can be liberated by heating so called isocyanate splitting compounds, may also be used in the process of this invention. Examples of such compounds are reaction products with phenols, tertiary alcohols, esters of malonic acid and acetoacetic acid, hydrocyanic acid and compounds which contain a uretdione group (dimeric isocyanates), e.g. compounds of the following constitution:

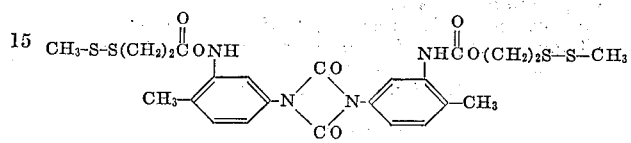

Surprisingly, here again, the masked NCO group was not attacked by chlorine.

In the halogenolysis of the disulfide isocyanates it is possible to use halogenating agents such as chlorine and bromine as well as both corresponding sulfuryl halides, phosphorous pentachloride and phosphorous pentabromide. However, it is preferred that chlorine be employed. It was found that iodine and fluorine were not suitable for the preparation of the corresponding sulfenyl halides.

The usual reaction conditions are used for the halogenolysis of the disulfide compound to the sulfenyl halide. The reaction is effected in the cold, preferably at a temperature of from about —50° C. to a temperature of about +70° C.; however, temperatures as high as 200° C. may be used in certain cases. It is preferred that the reaction be effected in the absence of moisture in order to avoid substitution reactions by the halogens. Also in some cases it is advisable to avoid the action of light during halogenolysis in order to prevent halogen substitution reactions.

The reaction may be effectuated in the presence or absence of solvents. It is preferred that the reaction between the isocyanate containing disulfide group and the halogen be effected in the presence of an inert organic solvent such as aliphatic and aromatic solvents as well as halogenated aliphatic and aromatic solvents. Examples of suitable solvents are halogenated hydrocarbons such as carbon tetrachloride, chloroform, methylene chloride and dichloroethane, dichlorobenzene and the like. Aromatic compounds and petroleum fractions may also be used.

In the preparation of the isocyanates containing thioether groups the sulfenyl halide isocyanates having the general formula: X—S—R—NCO wherein X and R were defined above, which were obtained from the halogenolysis of organic isocyanates containing disulfide groups in the molecule are reacted with unsaturated organic compounds. The unsaturated organic compounds must be free of functional groups which will react with free or masked NCO groups at low temperatures. The addition is usually quantitative and takes place according to the following general equation:

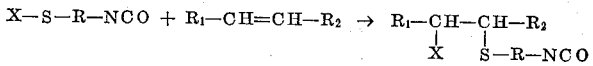

wherein $R_1$ and $R_2$, which may be the same or different, are organic radicals having from 1 to 16 carbon atoms. Thus, $R_1$ and $R_2$ may be an alkyl group such as methyl, ethyl, propyl, hexyl, heptyl, octyl and the like, aryl groups such as phenyl, alpha-naphthyl, beta-naphthyl, alpha-anthryl, beta-anthryl and the like; aralkyl groups such as phenyl-ethyl, phenyl propyl, phenyl-isopropyl, phenyl-butyl, phenyl-isobutyl, alpha-(alpha'-naphthyl) ethyl, alpha-(alpha'-naphthyl)-butyl and the like, alkaryl groups such as tolyl, xylyl, cumenyl, o-ethylphenyl, 2-methylalpha-naphthyl, 3-methyl-alpha-naphthyl, 1-ethyl-beta-naphthyl and the like. R and X have been defined above. Any suitable unsaturated compound containing olefinic double bonds or acetylenic triple bonds which are free of any functional groups which would react with free or masked NCO groups may be used. Monomeric unsaturated compounds are intended, but including compounds with a molecular weight of less than 1000. Examples of these types of compounds are: acetylene, propiolic acid esters, propargyl acetate, tolane, ethylene, propylene, butylene, cyclohexene, vinyl chloride, butadiene, isoprene, cyclopentadiene, hexachlorocyclopentadiene, styrene, acrylic-and methacrylic acid esters, crotonic acid esters, linseed oil, maleic and fumaric acid esters, styrene, cinnamic acid esters, divinylbenzene, vinyl esters, vinyl ethers, and thioethers, dioxene, triallylphosphate, triallylcyanurate, diallyl ethers, butadene sulphone, stilbene, nitrostilbenes, divinylsulphone and trichlorovinyl acetate. Also suitable are compounds which in addition contain in the molecule a functional group which does not react with free or masked NCO groups. Very valuable new isocyanates are obtained in this way. Compounds of this kind are, for example: acrylonitrile, acrylic chloride, vinyl isocyanate, acroylisothiocyanate, vinyl pyrrolidone, allyl chlorocarbonate, maleic acid anhydride, vinyl ethyl ketone, crotonaldehyde, acrolein, chloromethyl styrene, vinyl pyridine and the like.

The addition of the sulfenyl halides to the olefinic bonds is more difficult in the case of olefines which carry electronegative groups such as chlorine, phenyl, —COOR, —CN, or —CO on the double bond than with acetylenic hydrocarbons. The addition of the sulfenyl halides to the triple bond may lead both to the 1:1 or the 1:2 addition products depending on the constitution of the starting products employed. In the case of a 1:1 addition, unsaturated thioether isocyanates are obtained.

The reactants may be reacted in the absence of a solvent. However, it is preferred that they be reacted in the presence of an inert organic solvent to moderate the reaction between the reactants. These solvents also aid in controlling the exothermic reaction between the sulfenyl halide isocyanates and the unsaturated organic compound. In cases where a solvent is desired, aliphatic and aromatic solvents such as those used in the preparation of the sulfenyl halide isocyanates may be employed.

Many of the thioether isocyanates obtained by the process according to the invention are substances which can be obtained in pure form by suitable purification processes such as vacuum distillation, crystallization, filtration and the like.

These isocyanates are valuable products as intermediates in the synthesis of various organic compounds. They are useful as intermediates in the production of plant protective agents and auxilary products for rubber. These isocyanates are particularly useful in the reaction with active hydrogen containing compounds as determined by the Zerewitinoff method to produce adhesives, foams, caulks, elastomers, lacquers and the like.

The invention is further illustrated but is not intended to be limited by the following examples in which all parts and percentages are by weight unless otherwise specified.

Example 1

(a) Preparation of sulfenylchloride isocyanate.—Approximately 600 parts (2 mols) of 4,4′-bis-isocyanato-diphenyldisulfide (M.P. 58–60° C.) are dissolved in about 4,780 parts of carbon tetrachloride. Approximately 145 parts (4 gram atoms) of chlorine are introduced at 0 to 10° C. in the course of about 80 minutes. The mixture is then stirred for an additional 20 minutes at room temperature and the solvent is then removed using a water jet vacuum at a bath temperature of 50 to 60° C. Approximately 730 parts (theoretical 740 parts) of 4-isocyanato-phenyl-sulfenyl-chloride was recovered as a red colored liquid, B.P.$_{2.5\ mm.}$ 127–130° C.

Analysis.—$C_7H_4ClNOS$—185.6, calculated: C, 45.4; H, 2.15; Cl, 19.12; N, 7.55; O, 8.63; S, 17.25. Found: C, 45.32; H, 2.19; Cl, 20.00; N, 7.65; O, 8.76; S, 17.00.

(b) Addition to cyclohexene to form the compound

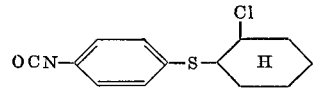

Approximately 185.6 parts (1 mol) of 4-isocyanatosulfenyl chloride are added dropwise at room temperature into about 82.1 parts of cyclohexene. The reaction is highly exothermic and the temperature is prevented from rising above 60° C. by cooling with ice. When the exothermic reaction has subsided the mixture is reacted for an additional 2 hours at 50° C. to 60° C. A pale yellow oil is recovered having a B.P.$_{0.4\ mm.}$ 165–175° C.

Analysis.—$C_{13}H_{14}NOSCl=267.5$, NCO number calculated 15.7, found 16.1; calculated: C, 58.4; H, 5.24; N, 5.24; S, 12.0; Cl, 13.3. Found: C, 58.67; H, 5.28; N, 5.90; S, 12.7; Cl, 11.7.

Example 2

(a) Preparation of sulfenyl chloride isocyanate.—A solution of about 300 parts (1 mol) of crude, non-recrystallized 4,4′-diisocyanato diphenyldisulfide in about 797 parts carbon tetrachloride is treated without external cooling for about 50 minutes with about 135 parts (1 mol) of sulfuryl chloride in about 240 parts carbon tetrachloride. The reaction which is only slightly exothermic sets in with evolution of $SO_2$. The reaction is completed in about 30 minutes by increasing the temperature to about 70° C. and the solvent is then removed. Distillation of the residue yields 320 parts (86.5% of theoretical) of 4-isocyanatophenylsulfenyl chloride having a B.P. $_{0.2\ mm.}$ of 86–88° C.

(b) Addition to acrylonitrile.—Approximately 106 parts of acrylonitrile are added dropwise at room temperature, with stirring, into about 370 parts (2 mols) of 4-isocyanatophenylsulfenyl chloride. After about 5 minutes, the temperature rises very rapidly. The temperature is prevented from rising above about 80° C. by cooling. Traces of unreacted acrylonitrile are then removed in a high vacuum at a bath temperature of 120° C. to about 130° C. A brown oil, which cannot be distilled without decomposition, was recovered which has the formula:

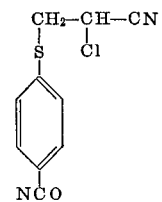

The yield is practically quantitative.

Analysis.—$C_{10}H_7N_2SOCl=238.5$, calculated: C, 50.3; H, 2.9; N, 11.6; S, 13.3; Cl, 15.5. Found: C, 50.5; H, 3.1; N, 11.7; S, 13.4; Cl, 14.9.

Example 3

(a) Preparation of the sulfenyl chloride isocyanate.—A suspension of about 10.4 parts (0.05 mol) of phosphorus pentachloride in about 96 parts of carbon tetrachloride is treated with a solution of about 15 parts (0.05 mol) of 4,4′-diisocyanatodiphenyldisulfide in about 48 parts of carbon tetrachloride and heated for about 10 minutes to a temperature between about 50° C. to about 60° C. The almost homogeneous pale brown solution formed is clarified with charcoal, freed from more volatile constituents using a water-jet vacuum and the 4-isocyanatophenylsulfenyl chloride thus obtained is then distilled.

(b) Addition to propylene.—Proplene gas is introduced at room temperature into 185 parts (1 mol) of 4- isocyanatophenylsulfenyl chloride. The temperature rises very rapidly so that the reaction mixture must be cooled with ice. The gas is introduced until there is no further exothermic reaction. Excess propylene is then expelled with nitrogen at a temperature of between about 40° C. to 50° C. A quantitative yield of product having a B.P.$_{0.9\ mm.}$ 127–130° C. was recovered having the following formula:

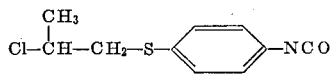

*Analysis.*—$C_{10}H_{10}ClNOS$=227.5, calculated: C, 52.7; H, 4.4; Cl, 15.6; N, 6.2; S, 14.1. Found: C, 52.4; H, 4.2; Cl, 16.2; N, 6.1; S, 14.4.

Example 4

(a) *Preparation of sulfenylchloride isocyanate.*—Approximately 300 parts of 2,2′-diisocyanatodiphenyldisulfide is contacted with chlorine as in Example 1. An 82% theoretical yield of 2-isocyanato-phenylsulfenyl chloride is obtained having a B.P.$_{.0.4\ mm.}$ of 83–87° C.

(b) *Addition to butadiene.*—Butadiene is introduced at room temperature into about 185 parts of 2-isocyanato-phenylsulfenyl chloride. The temperature rises to about 100° C. When the exothermic reaction has subsided, the excess butadiene is expelled with nitrogen at a temperature of between about 50° C. to 70° C. A diisocyanate of oily consistency is obtained having an NCO number of 10.0. Theoretical NCO number for this diisocyanate compound was calculated as 9.9.

Example 5

(a) *Preparation of sulfenylchloride isocyanate.*—Approximately 71 parts chlorine are introduced in the course of about 2 hours into a melt of about 300 parts (1 mol) of 4,4′-diisocyanato-diphenyldisulfide at a temperature of between about 55° C.–65° C. Approximately 295 parts of a product (79.5% of theoretical) which was identified as 4-isocyanato-phenylsulfenyl chloride having a B.P.$_{.1.0\ mm.}$ of 104–106° C. was recovered.

(b) *Addition to methyl acrylate.*—Approximately 37 (0.2 mol) of 4-isocyanatophenyl-sulfenyl chloride are added dropwise at room temperature to about 19.5 parts of methyl acrylate. A highly exothermic reaction takes place at once and is arrested at 70° C. by cooling with ice water. The excess acrylic ester is then distilled off in vacuo. The addition product was recovered as a pale brown oil.

*Analysis.*—$C_{11}H_{10}ClNO_3S$=271.5, calculated: C, 48.6; H, 3.7; Cl, 13.1; N, 5.2. Found: C, 48.6, H, 3.8; Cl, 13.3; N, 5.2.

Example 6

(a) *Preparation of sulfenylbromide isocyanate.*—A solution of about 15.9 parts of bromine in about 159.5 parts carbon tetrachloride is added at a temperature of between about 25° C. to 30° C. to a solution of about 30 parts 4,4′-diisocyanato-diphenyldisulfide in about 112 parts carbon tetrachloride and then heated to boiling for 4.5 hours. After clarification with charcoal, the filtrate is concentrated by evaporation and distilled. The distillate which has a B.P.$_{.0.3\ mm.}$ of between 92° C. to 105° C. shows the characteristic bands of sulfenyl chloride in the IR spectrum.

(b) *Addition to styrene.*—Approximately 5.5 parts (0.055 mol) styrene are added dropwise with stirring to about 11.5 parts (0.05 mol) of 4-isocyanato-phenyl-sulfenyl bromide. The slight excess of styrene is removed in a high vacuum at a temperature of between about 90° C. to 110° C. The addition product which is obtained in a practically quantitative yield as a pale brown oil has the following formula:

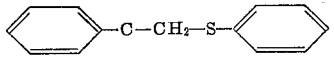

*Analysis.*—$C_{15}H_{12}$ BrNOS=334.2, calculated: C, 53.9; H, 3.6; Br, 23.9; N, 4.2. Found: C, 54.3; H, 3.8; Br, 23.5; N, 3.9.

Example 7

47 parts of 4-isocyanato-phenyl-sulfenyl chloride are added dropwise at 20 to 30° C. to a solution of 50 parts of linseed oil (molecular weight 850; iodine number 135) dissolved in 390 parts of methylene chloride. Stirring is continued for half an hour at 30° C. A 20 percent solution of the addition product is obtained. NCO content calculated 2.16%, found 2.08%, 2.10%.

Example 8

50 parts of soya bean oil (average molecular weight 850; iodine number 135) are dissolved in 380 parts of methylene chloride. At room temperature 44 parts of 4-isocyanato-phenyl-sulfenyl chloride are added portionwise. To complete the addition the solution is kept for half an hour at 30° C. The solution of the addition product exhibits an isocyanate content of 2.04%, 2.06% (found). Calculated is 2.11%.

Example 9

50 parts of 4-isocyanato-phenyl-sulfenyl chloride are added dropwise to a solution of 50 parts of ricinene oil (average molecular weight 850; iodine number 115) dissolved in 400 parts of methylene chloride. A 20 percent solution of the addition product is obtained. Isocyanate content, calculated: 2.27%. Found: 2.38%; 2.43%.

Example 10

93 parts of 4-isocyanato-phenyl-sulfenyl chloride are dissolved in 100 parts of chloroform. At 40° C. acetylene is passed through the solution until the exothermic reaction has ceased. When evaporating the solution the bis-(4-isocyanato-phenyl-sulfenyl)-dichloro ethane crystallizes in pale yellow-brown polyhedrons (M.P. 100 to 106° C.). The crystals are filtered with suction. 84 parts of the addition product can be recrystallized from benzene (M.P. 120 to 122° C.). The nuclear resonance spectrum leads to the assumption that the addition to the acetylene proceeds in 1,1 as well as in 1,2 position.

*Analysis.*—$C_{16}H_{10}Cl_2N_2O_2S_2$=397.3, calculated: C, 48.37; H, 2.54; Cl, 17.85; N, 7.05; S, 16.14. Found: C, 49.10; H, 2.83; Cl, 18.1; N, 7.26; S, 16.05.

Example 11

Butadiene is past with low speed into 186 parts of 4-isocyanato-phenyl-sulfenyl chloride. The temperature should be kept between 40 and 50° C. If no more butadiene is added, the mixture is distilled in a high vacuo up to 90° C. The remainder is a brown oil with a yield of 208 parts which consists of a mixture of the isomeric bis-(4-isocyanato-phenyl-sulfenyl)-dichloro butane. Distillation of the raw product results in a partial decomposition.

*Analysis.*—$C_{18}H_{14}Cl_2N_2O_2S_2$=425.4, calculated: C, 50.83; H, 3.32; N, 6.58; Cl, 16.67. Found: C, 50.41; H, 3.19; N, 6.92; Cl, 17.10.

Example 12

Ethylene is past until saturation at 35° C. into a solution of 371 parts of 4-isocyanato-phenyl-sulfenyl chloride in 350 parts of chloroform. Excess ethylene and the solvent are distilled off. The residue is fractionated in high vacuo. 4-(β-chloroethyl sulfenyl)-phenyl isocyanate is obtained as a yellow liquid (B.P. 121-125 at 0.3 mm.). The liquid solidifies to yellow polyhedrons (M.P. 41 to 43° C.).

*Analysis.*—Calculated: C, 50.59; H, 3.77; Cl, 16.59; N, 6.56. Found: C, 50.30; H, 3.86; Cl, 17.00; N, 6.65.

Example 13

371 parts of 4-isocyanato-phenyl-sulfenyl-chloride are dissolved in 200 parts of chlorofrom. Isobutylene is passed while cooling at 20 to 30° C. into the solution until the exothermic reaction is completed. The reaction mixture is fractionated. 4-(2-chloro-isobutyl-1-sulfenyl)-phenyl isocyanate distills as a pale brown liquid (B.P. 129 to 134° C. at 0.35 mm.).

Analysis.—$C_{11}H_{12}ClNOS$=241.8, calculated: C, 54.65; H, 5.00; N, 5.79; S, 13.26. Found: C, 55.40; H, 5.07; N, 5.77; S, 13.55.

Example 14

A solution of 186 g. of 4-isocyanato-phenyl-sulfenyl chloride in 100 parts of methylene chloride is added dropwise to 108 parts of cyclooctadiene-1,5 dissolved in 150 parts of methylene chloride. Stirring is continued for one hour at 40° C. The solution is filtered and the solvent as well as volatile parts are distilled off the filtrate. Distillation is continued finally in high vacuo up to a bath temperature of 90° C. A dark oil remains which is bis-(4-isocyanato-phenyl-sulfenyl)-dichloro cyclooctane.

Analysis.—$C_{22}H_{20}Cl_2N_2O_2S_2$=479.5, calculated: C, 55.11; H, 4.21; N, 5.84; S, 13.38. Found: C, 55.03; H, 4.66; N, 5.46; S, 12.90.

Example 15

A solution of 186 parts of 4-isocyanato-phenyl-sulfenyl chloride in 180 parts of methylene chloride is added dropwise to a solution of 31 parts of cycloheptatriene in 200 parts of methylene chloride. The temperature is kept at 10° C. Stirring is continued for four hours at room temperature. The solvent is distilled off finally in high vacuo. Tris-(4 - isocyanato-phenyl-sulfenyl)-trichloro cycloheptane is obtained as a brown resin.

Analysis.—$C_{28}H_{20}Cl_3N_3O_3S_3$=649.1, calculated: C, 51.82; H, 3.11; N, 6.47; S, 14.82. Found: C, 51.46; H, 3.14; N, 6.60; S, 15.10.

Example 16

56 parts of 4-isocyanato-phenyl-sulfenyl chloride are added dropwise at 30° C. to a solution of 16 parts of cyclododecatriene in 308 parts of methylene chloride. Tris-(4-isocyanato-phenyl-sulfenyl)-trichloro cyclododecane is obtained as a 20 percent solution.

Isocyanate content of the solution.—Calculated: 3.60%. Found: 3.42%, 3.74%. If the solvent is distilled off a brittle brown resin is obtained which softens at 55° C.

Analysis.—$C_{33}H_{30}Cl_3N_3O_3S_3$=719.2, calculated: C, 55.11; H, 4.21; N, 5.84; Cl, 14.79. Found: C, 55.26; H, 4.24; N, 5.95; Cl, 15.10.

Example 17

56 parts of 4-isocyanato-phenyl-sulfenyl chloride are added dropwise to a solution of 22 parts of triallyl phosphate in 332 parts of methylene chloride. Temperature is kept at 25° C. Phosphoric acid-tris-[(4-isocyanato-phenyl-sulfenyl)-chloropropyl]-ester is obtained as a 20 percent solution.

Isocyanate content.—Calculated: 3.26%. Found: 3.32%, 3.36%.

Example 18

56 parts of 4-isocyanato-phenyl-sulfenyl chloride are added dropwise to a solution of 25 parts of triallyl cyanurate in 344 parts of methylene chloride. Tris-[(4-isocyanato-phenyl-sulfenyl) - chloro-propyl]-cyanurate is obtained as a 20 percent solution.

Isocyanate content.—Calculated: 3.08%. Found: 3.17%, 3.24%.

Example 19

56 parts of 4-isocyanato-phenyl-sulfenyl chloride are added dropwise to a solution of 25 parts of triallyl isocyanurate in 344 parts of methylene chloride. The temperature is kept at 25° C. Tris-[(4-isocyanato-phenyl-sulfenyl)-chloro-propyl]-isocyanurate is obtained as a 20 percent solution.

Isocyanate content.—Calculated: 3.08%. Found: 3.18%, 3.22%.

Example 20

186 parts of 4-isocyanato-phenyl-sulfenyl chloride are added dropwise to a solution of 118 parts of butadiene sulfon in 100 parts of chloroform. The reaction mixture is stirred for four hours at 40° C. The solvent is distilled off and the residue is degassed at 80° C./0.3 mm. 3-(4-isocyanato-phenyl-sulfenyl)-4-chloro tetramethylene sulfon is obtained as a dark oil.

Analysis.—$C_{11}H_{10}ClNO_3S_2$=303.80, calculated: C, 43.49; H, 3.32; N, 4.61; Cl, 11.67. Found: C, 43.59; H, 3.36; N, 5.02; Cl, 12.05.

Example 21

(a) Preparation of sulfenyl chloride isocyanate.—37 parts of 2,2'-dichloro-4,4'-diisocyanato diphenyl disulfide are dissolved in 125 parts of carbon tetrachloride. At 10° C. 7.2 parts of chlorine are passed into the solution within five minutes. The reddish-brown solution thus obtained is kept while stirring for further five minutes and then treated with charcoal. The solvent is removed in vacuo. 2-chloro-4-isocyanato-phenyl-sulfenyl chloride is obtained as a reddish-brown material in a yield of 39 parts (B.P. 145 to 148°/2.0 mm.).

Analysis.—$C_7H_3Cl_2NOS$=220.1, calculated: C, 38.2; H, 1.4; N, 6.4; S, 14.5; Cl, 32.2. Found: C, 38.3; H, 1.5; N, 6.3; S, 14.3; Cl, 32.3.

(b) Addition to ethylene.—Ethylene is passed into a solution of 110 parts of 2-chlor-4-isocyanato-phenyl-sulfenyl chloride in 120 parts of chloroform at 10° C. until saturation. The solvent is distilled off and the residue is fractionated in high vacuo. 4-(β-chloroethyl-sulfenyl)-3-chlorophenyl isocyanate boils as a yellow oil at 117 to 120° C./0.1 mm.

Analysis.—$C_9H_7Cl_2NOS$=248.14, calculated: C, 43.56; H, 2.84; N, 5.65; Cl, 28.58. Found: C, 43.08; H, 2.81; N, 5.82; Cl, 28.80.

Example 22

(a) Preparation of masked sulfenyl bromide.—12.2 parts of diphenyl disulfide-4,4'-N,N'-bis-carbamic acid-phenyl ester are suspended in 40 parts of methylene chloride. 1.6 parts of bromine dissolved in 10 parts of methylene chloride are added dropwise to the suspension. The reaction mixture is stirred for another hour at room temperature. The reddish-brown sulphenyl bomide is filtered with suction and washed with methylene chloride.

Yield: 13.5 parts (M.P. 141 to 143° C. under decomposition).

Analysis.—$C_{13}H_{10}BrNO_2S$=324.2, calculated: N, 4.3; S, 9.9; Br, 24.6. Found: N, 4.6; S, 10.3; Br. 22.2.

(b) Addition to linseed oil.—8 parts of the sulfenyl bromide are dissolved in 50 parts of methylene chloride and added dropwise at 20° C. to the solution of 20 parts of linseed oil (average molecular weight 850; iodine number 134) in 62 parts of methylene chloride. A 20 percent solution of the addition product is obtained.

Bromine content.—Calculated: 1.41%. Found: 1.54%; 1.65%.

Example 23

(a) Preparation of the masked sulfenyl chloride isocyanate.—10 parts of chlorine are passed at 5 to 10° C. within 10 minutes into a suspension of diphenyl disulfide-4,4'-N,N'-bis-carbamic acid phenyl ester in 300 parts of carbon tetrachloride. The mixture is stirred for 30 minutes at room temperature and then filtered with suction. The precipitate is washed and dried. A yellow product is obtained which melts at 103 to 105° C. under decomposition.

Analysis.—$C_{13}H_{10}ClNO_2S$=279.7, calculated: C, 55.8; H, 3.6; N, 5.0; S, 11.5; Cl, 12.7. Found: C, 55.2; H, 3.7; N, 5.6; S, 11.3; Cl, 13.2.

Instead of chlorine it is possible to employ 13.6 parts of sulfuryl chloride. After adding dropwise the sulfuryl chloride the mixture is heated to 70° C. for about 30 minutes until evolution of sulphur dioxide is completed. 53 parts, that is 95 percent of the theory of the phenyl-4-carbamic acid phenyl ester-1-sulfenyl chloride are obtained.

(b) Addition to the soya bean oil.—50 parts of soya bean oil (average molecular weight 850; iodine number 125) are disolved in 212 parts of methylene chloride. 28 parts of the above sulfenyl chloride in 100 parts of methylene chloride are added dropwise at 20° C. A 20 percent solution of the addition product is obtained.

Nitrogen content.—Calculated: 0.36%. Found: 0.45%; 0.43%.

From the previous examples it is apparent that the compositions of the invention may be produced by contacting an isocyanate containing a disulfide group in its molecule with a halogen containing an organic compound to yield a sulfenyl halide isocyanate which may be subsequently reacted with an unsaturated organic compound to produce an isocyanate containing a thioether group.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A compound of the formula X—S—R—NCO, wherein X is a halogen radical selected from the group consisting of chlorine and bromine and R is a divalent aromatic radical having up to 16 carbon atoms selected from the group consisting of
   (A) arylene,
   (B) alkarylene,
   (C) aralkylene, and
   (D) arylene, alkarylene or aralkylene radical substituted with a radical selected from the group consisting of
      (1) halogen,
      (2) nitro,
      (3) isocyanato,
      (4) cycloalkyl,
      (5) bivalent $$-\text{NH}-\overset{\overset{\text{O}}{\|}}{\text{C}}-\text{O}-$$

as an integral part of the radical chain,
      (6) OR' and
      (7) —SR' radical wherein R' is a radical selected from the group consisting of
         (a) alkyl,
         (b) aryl and
         (c) cycloalkyl radical.

2. A compound of the formula X—S—R—NCO, wherein X is a halogen radical selected from the group consisting of chlorine and bromine and R is an aromatic radical having up to 16 carbon atoms selected from the group consisting of
   (A) phenylene,
   (B) naphthylene,
   (C) divalent benzothiazolyl and
   (D) phenylene, naphthylene or divalent benzothiazolyl radical substituted with a radical selected from the group consisting of
      (1) halogen,
      (2) nitro,
      (3) isocyanato and
      (4) alkyl.

3. A compound having the formula:

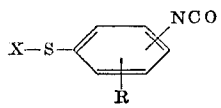

wherein X is a member selected from the group consisting of chlorine or bromine and R is a member selected from the group consisting of hydrogen, halogen, nitro, alkyl having from 1 to 8 carbon atoms, cycloalkyl having from 7–12 carbon atoms, OR' and SR' wherein R' is a member selected from the group consisting of alkyl having from 1 to 8 carbon atoms, aryl and cycloalkyl having from 7–12 carbon atoms.

4. A compound having the formula

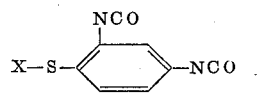

wherein X is a member selected from the group consisting of chlorine or bromine.

5. A sulfenyl chloride of the formula

6. A compound having the formula

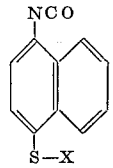

wherein X is a member selected from the group consisting of chlorine or bromine.

7. A compound having the formula

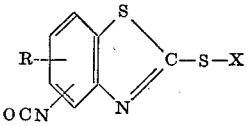

wherein X is a member selected from the group consisting of chlorine or bromine and R is a member selected from the group consisting of hydrogen, halogen, nitro, alkyl having from 1 to 8 carbon atoms, cycloalkyl having from 7–12 carbon atoms, OR' and SR' wherein R' is a member selected from the group consisting of alkyl having from 1 to 8 carbon atoms, aryl and cycloalkyl having from 7–12 carbon atoms.

8. A compound having the formula

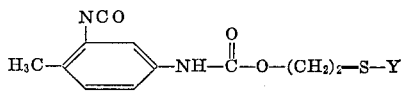

wherein X is a member selected from the group consisting of chlorine or bromine.

9. A compound having the formula

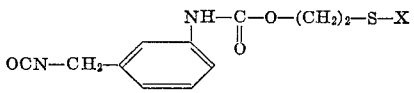

wherein X is a member selected from the group consisting of chlorine or bromine.

10. A method of preparing the organic isocyanate of claim 1 which comprises reacting in the absence of moisture an organic isocyanate having a disulfide group in the molecule with a halogen containing compound selected from the group consisting of chlorine, bromine, sulfuryl chloride, sulfuryl bromide, phosphoryl pentachloride and phosphoryl pentabromide.

11. The method of claim 10 wherein the reaction between the organic isocyanate and the halogen containing compound is effected at a temperature of from about −50° C. to about +70° C.

12. The method of claim 10 wherein the reaction is conducted in the presence of an inert organic solvent.

(References on following page)

References Cited

UNITED STATES PATENTS

| | | | |
|---|---|---|---|
| 2,807,615 | 8/1957 | Himel | 260—543 XR |
| 2,809,997 | 10/1957 | Johnston | 260—543 XR |
| 2,992,233 | 7/1961 | Stansbury et al. | 260—543 XR |
| 2,993,075 | 7/1961 | Heininger et al. | 260—543 XR |
| 3,014,071 | 12/1961 | Hoyt et al. | 260—543 |
| 3,019,258 | 1/1962 | Haaptschein et al. | 260—543 |
| 3,142,694 | 7/1964 | Metivier | 260—453 XR |
| 3,168,545 | 2/1965 | Harper | 260—453 |
| 3,200,146 | 8/1965 | Weil et al. | 260—543 |
| 3,281,447 | 10/1966 | Knopf et al. | 260—453 |

FOREIGN PATENTS

| | | |
|---|---|---|
| 790,021 | 1/1958 | Great Britain. |
| 1,119,853 | 12/1961 | Germany. |

OTHER REFERENCES

Brintzinger et al., Ber. Deut. Chem., vol 87, pp. 300–314 (1954).

Brintzinger et al., Ber. Deut. Chem., vol 87, pp. 320–330 (1954).

Pelster, C. A., vol. 61, pp. 6919–6920 (1964).

FLOYD D. HIGEL, *Primary Examiner.*

UNITED STATES PATENT OFFICE
CERTIFICATE OF CORRECTION

Patent No. 3,409,631                                    November 5, 196

Hans Holtschmidt et al.

It is certified that error appears in the above identified patent and that said Letters Patent are hereby corrected as shown below:

Column 3, lines 70 to 75, the last formula should appear as shown below:

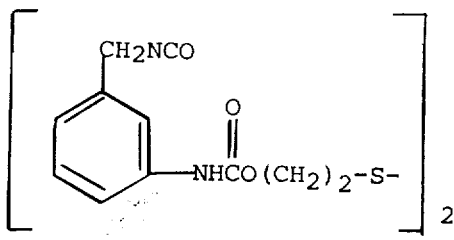

Column 5, line 17, "butadene" should read -- butadiene --; line 54, auxilary" should read -- auxiliary --. Column 6, line 74, "Proplene" should read -- Propylene --. Column 7, line 42, after "37" insert -- parts --. Column 7, lines 8 to 11, the formula should appear as shown below:

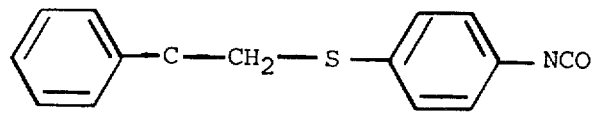

Column 10, line 46, "bomide" should read -- bromide --. Column 12, lines 48 to 51, the formula should appear as shown below:

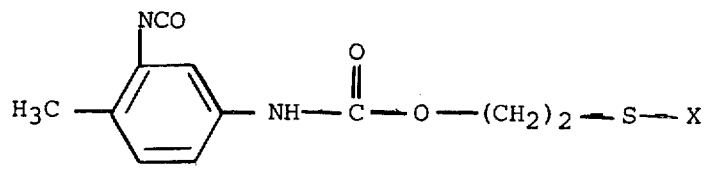

Signed and sealed this 10th day of March 1970.

(SEAL)
Attest:

EDWARD M. FLETCHER, JR.                         WILLIAM E. SCHUYLER, JR.
Attesting Officer                               Commissioner of Patents